United States Patent
Fujii et al.

(10) Patent No.: US 11,495,885 B2
(45) Date of Patent: Nov. 8, 2022

(54) SENSOR MODULE

(71) Applicants: SHINKO ELECTRIC INDUSTRIES CO., LTD., Nagano (JP); National University Corporation YOKOHAMA National University, Kanagawa (JP)

(72) Inventors: Tomoharu Fujii, Nagano (JP); Takumi Ikeda, Nagano (JP); Hiroyuki Arai, Kanagawa (JP)

(73) Assignees: SHINKO ELECTRIC INDUSTRIES CO., LTD., Nagano (JP); National University Corporation YOKOHAMA National University, Kanagawa (JP)

( * ) Notice: Subject to any disclaimer, the term of this patent is extended or adjusted under 35 U.S.C. 154(b) by 10 days.

(21) Appl. No.: 17/209,352

(22) Filed: Mar. 23, 2021

(65) Prior Publication Data

US 2021/0305696 A1 Sep. 30, 2021

(30) Foreign Application Priority Data

Mar. 26, 2020 (JP) .............................. JP2020-056121
Mar. 3, 2021 (JP) .............................. JP2021-033266

(51) Int. Cl.
  *H01Q 5/378* (2015.01)
  *H01Q 1/38* (2006.01)
  *H01Q 1/40* (2006.01)
  *H01Q 13/08* (2006.01)
  *H01Q 9/04* (2006.01)

(52) U.S. Cl.
  CPC .............. *H01Q 5/378* (2015.01); *H01Q 1/38* (2013.01); *H01Q 1/40* (2013.01); *H01Q 13/08* (2013.01); *H01Q 9/045* (2013.01)

(58) Field of Classification Search
  CPC ............ H01Q 5/375; H01Q 1/38; H01Q 1/40; H01Q 13/08; H01Q 9/045; H01Q 13/16; H01Q 13/18; H01Q 1/2208; H04Q 2209/40; H04Q 9/00
  See application file for complete search history.

(56) References Cited

U.S. PATENT DOCUMENTS

| 2014/0163338 A1* | 6/2014 | Roesicke | ............. | A61B 5/0031 |
| | | | | 600/309 |
| 2015/0236610 A1* | 8/2015 | Sasaki | .................. | G01N 29/223 |
| | | | | 73/649 |

FOREIGN PATENT DOCUMENTS

| CN | 207662999 U | 7/2018 | |
| JP | H09-148840 | 6/1997 | |
| WO | 2014/050349 | 4/2014 | |
| WO | WO-2014050349 A1 * | 4/2014 | ............ G01M 3/243 |

OTHER PUBLICATIONS

Extended European Search Report dated Aug. 27, 2021 with regard to the corresponding European Patent Application No. 21164695.5.

* cited by examiner

*Primary Examiner* — David E Lotter
(74) *Attorney, Agent, or Firm* — IPUSA, PLLC

(57) ABSTRACT

A sensor module includes: a metal member having a recessed portion; a resin portion embedded within the recessed portion; a radiator provided within the resin portion and configured to emit radio waves; a wireless communication portion provided within the resin portion and connected to the radiator; and a sensor connected to the wireless communication portion, wherein the metal member is insulated from the radiator by the resin portion and functions as a parasitic element.

13 Claims, 18 Drawing Sheets

XY-plane

YZ-plane

XY-plane

YZ-plane

SENSOR MODULE

CROSS-REFERENCE TO RELATED APPLICATION

This application is based upon and claims priority to Japanese Patent Application No. 2020-056121, filed on Mar. 26, 2020, and Japanese Patent Application No. 2021-33266, filed on Mar. 3, 2021, the entire contents of which are incorporated herein by reference.

FIELD

The present disclosure relates to a sensor module.

BACKGROUND

Conventionally, microstrip antennas include a dielectric substrate sandwiched between a patch surface and a ground surface of a radiating conductor (see, for example, Japanese Patent Application Laid-1). In the microstrip antenna, at least a portion of the ground surface is bent so that its tip has a height substantially equal to the patch surface, a side surface of the dielectric substrate is covered with a bent portion, and a surface including the patch surface is configured so that an interval between a peripheral end of the patch surface and a bent end of the ground surface is longer than the height of the bent portion of the ground surface.

RELATED-ART DOCUMENTS

Patent Documents

[Patent Document 1] Japanese Laid-open Patent Publication No. H09-148840

Here, the conventional microstrip antenna is not designed in consideration of incorporating a sensor into a sensor module.

Therefore, an object of the present disclosure is to provide a sensor module with favorable radiation characteristics.

SUMMARY

According to an aspect of the present disclosure, a sensor module includes: a metal member having a recessed portion; a resin portion embedded within the recessed portion; a radiator provided within the resin portion and configured to emit radio waves; a wireless communication portion provided within the resin portion and connected to the radiator; and a sensor connected to the wireless communication portion, wherein the metal member is insulated from the radiator by the resin portion and functions as a parasitic element.

It is possible to provide a sensor module with favorable radiation characteristics.

The object and advantages of the invention will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

In the following, sensor modules according to embodiments of the present disclosure will be described.

EMBODIMENT

Figure 1:
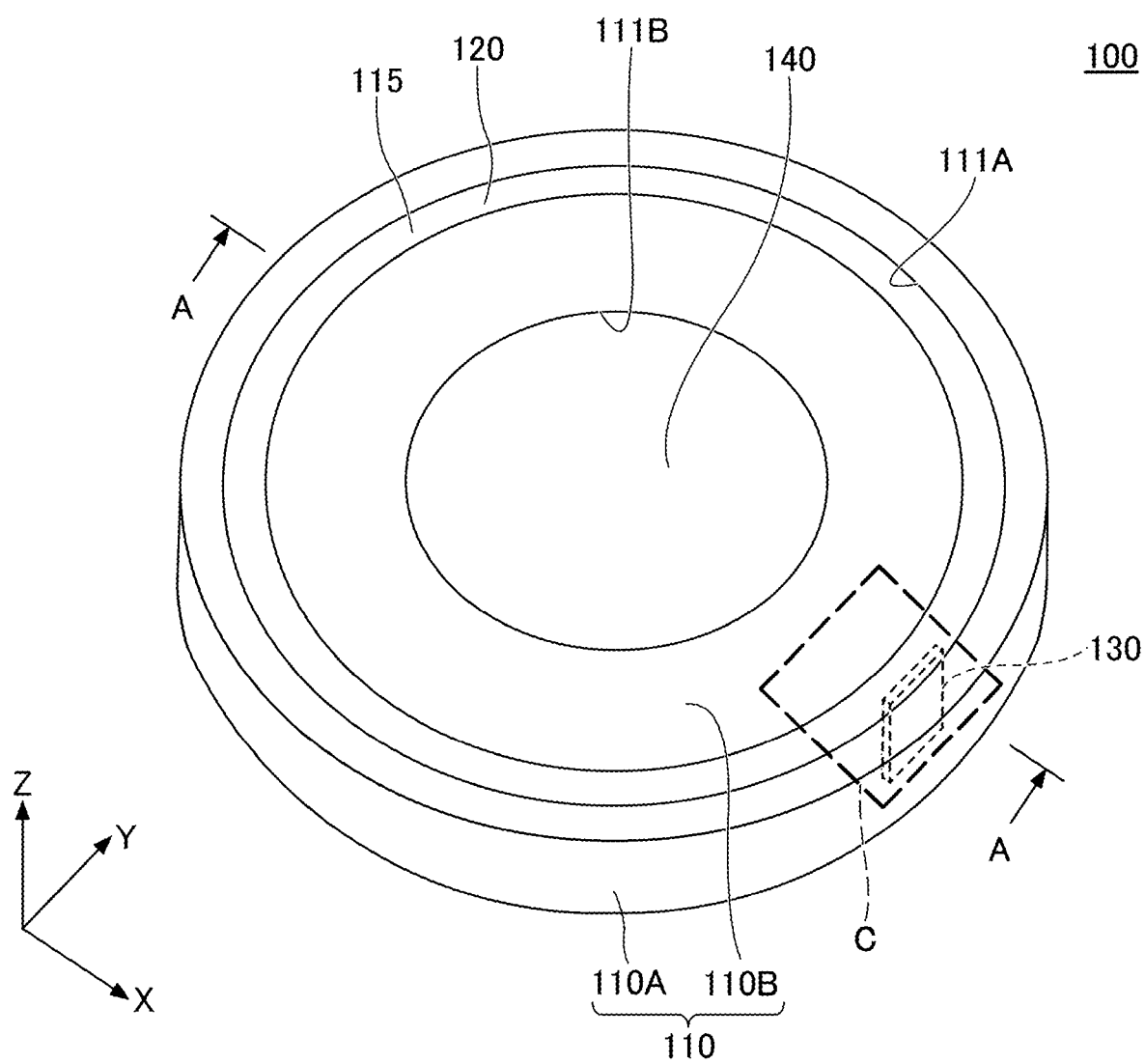
FIG. 1 is a diagram illustrating a sensor module 100 according to an embodiment.
Figure 2:
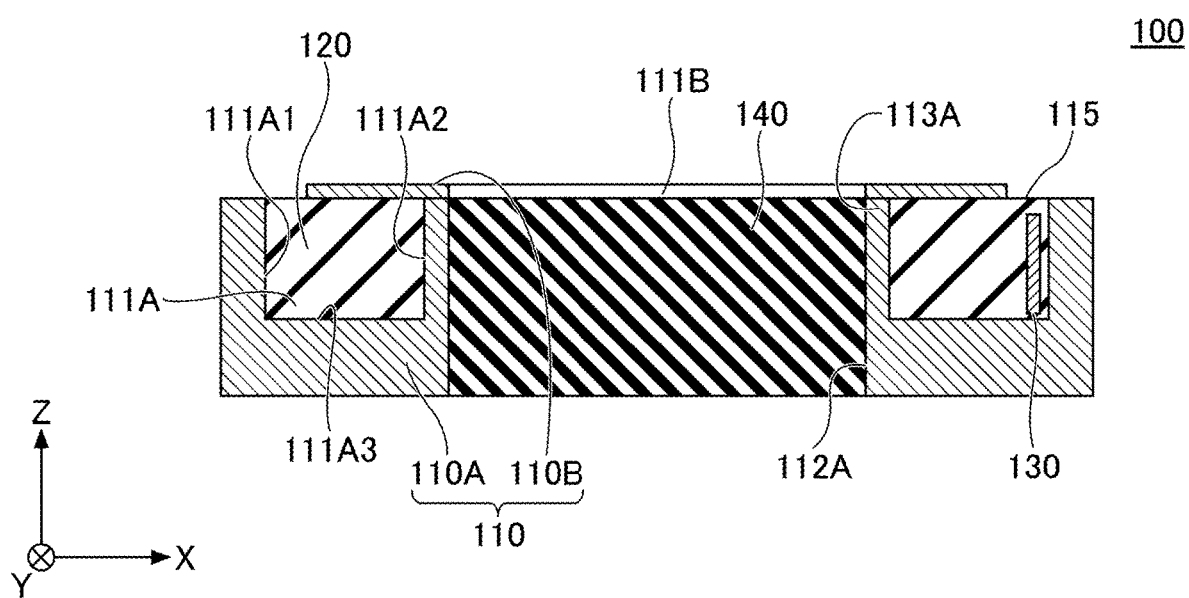
FIG. 2 is a diagram illustrating the A-A arrow cross-section of FIG. 1.

FIG. 1 is a diagram illustrating a sensor module 100 according to an embodiment. FIG. 2 is a diagram illustrating the A-A arrow cross-section of FIG. 1. In the following, an XYZ coordinate system is defined for description, and an XY plane view is referred to as a plan view. For the sake of description, the −Z direction side is referred to as the lower side or below, and the +Z direction side is referred to as the upper side, upward, or above, but it does not represent a universal vertical relationship.

The sensor module 100 includes a metal member 110 (110A, 110B), a resin portion 120, a multi-module 130, and a resin portion 140. The sensor module 100 is a disk-shaped member.

The metal member 110 is an example of a first metal member and includes a metal member 110A and a metal member 110B. In the following, the combination of the metal member 110A and the metal member 110B may be referred to as the metal member 110.

The metal member 110A is a member made of metal and having an annular shape, and has a groove portion 111A recessed annularly from the upper surface and a through hole 112A extending in the vertical direction at the central portion in plan view. The groove portion 111A is an example of a recessed portion and has an inner peripheral surface 111A1 on the outer side, an inner peripheral surface 111A2 on the inner side, and a bottom surface 111A3. For example, the metal member 110A may be made of a metal such as stainless steel, iron, aluminum, or tungsten.

The metal member 110B is an example of a second metal member and is a thin-plate-shaped annular member. The outer diameter of the metal member 110B is smaller than the inner diameter of the cylindrical inner peripheral surface 111A1 on the outer side of the groove portion 111A of the metal member 110A. The metal member 110B has a through hole 111B that penetrates in the vertical direction at the central portion. The size of the opening of the through hole 111B is equal to the size of the opening of the through hole 112A and their central positions are adjusted to match.

The inner peripheral side end portion of the metal member 110B is fixed to an upper end 113A at the inner peripheral portion of the metal member 110A and is arranged over the resin portion 120 that is provided within the groove portion 111A of the metal member 110A. The metal member 110B is configured so that the inner peripheral side portion of the groove portion 111A is capped with a flange. As illustrated in FIG. 2, the flange that is realized by the metal member 110B is oriented from the inner side toward the outer side in the radial direction of the groove portion 111A. Also, an annular slit 115 is constituted between the upper end of the inner peripheral surface 111A1 on the outer side of the groove portion 111A of the metal member 110A and the outer peripheral end of the metal member 110B. For example, the metal member 110B may be made of a metal such as stainless steel, iron, aluminum, or tungsten.

The resin portion 120 is embedded in the entirety within the groove portion 111A of the metal member 110A. Also, the resin portion 120 encloses the multi-module 130 such that the multi-module 130 is not in direct contact with the metal members 110A and 110B. The resin portion 120 may be a resin that can be filled into the groove portion 111A and may be, for example, a sealing resin including an epoxy resin.

For example, the multi-module 130 is a multi-functional module having a communication function and a sensor function. The communication function is implemented by a radiator and a wireless communication portion of the multi-module 130. As an example, the sensor function is implemented by a strain sensor (strain gauge), an accelerometer, a thermometer, or the like.

For example, the multi-module 130 has a thin board shape and is embedded within the resin portion 120. For example, the multi-module 130 is arranged near the cylindrical inner peripheral surface 111A1 on the outer side of the groove portion 111A of the metal member 110A in a state in which the radiator stands upward. The details of the multi-module 130 will be described later below with reference to FIGS. 3A to 3D.

The resin portion 140 is embedded in the entirety within the through hole 112A of the metal member 110A. The resin portion 140 may be a resin that can be filled into the through hole 112A and may be, for example, a sealing resin including an epoxy resin.

In the sensor module 100 having such a configuration, the annular slit 115 is constituted between the upper end of the inner peripheral surface 111A1 on the outer side of the groove portion 111A of the metal member 110A and the outer peripheral end of the metal member 110B. The length of one circumference of the slit 115 is set to be the electrical length of one wavelength at a frequency (communication frequency) of the radio waves emitted from the radiator of the multi-module 130. More specifically, at the upper end of the inner peripheral surface 111A1, which is located outermost in the radial direction of the slit 115, the length of one circumference is set to be the electrical length of one wavelength at the communication frequency of the multi-module 130.

It should be noted that the length of one circumference at the outer peripheral end of the metal member 110B, which is located innermost in the radial direction of the slit 115, may be set to be the electrical length of one wavelength at the communication frequency of the multi-module 130. Also, between the upper end of the inner peripheral surface 111A1, which is located outermost in the radial direction of the slit 115, and the outer peripheral end of the metal member 110B, which is located innermost in the radial direction of the slit 115, the length of one circumference of the slit 115 may be set to be the electrical length of one wavelength at the communication frequency of the multi-module 130.

According to the sensor module 100, by including the slit 115 as described above, radio waves emitted from the radiator of the multi-module 130 resonate at the metal members 110A and 110B and are emitted to the outside of the sensor module 100. At this time, the metal members 110A and 110B function as a parasitic element.

It should be noted that the length of one circumference of the slit 115, as described above, is not required to be exactly the electrical length of one wavelength at the communication frequency of the multi-module 130. For example, the resin portion 120 is arranged within the groove portion 111A of the metal member 110A, and the resin portion 140 is arranged within the through hole 112A. Also, the multi-module 130 is arranged within the resin portion 120. Thus, in a case in which the impedance characteristics vary due to the arrangement of the resin portion 120, the multi-module 130, and the resin portion 140 in the metal member 110, the length of one circumference of the slit 115 may be adjusted to be slightly shorter or slightly longer than the electrical length of one wavelength at the communication frequency of the multi-module 130 so as to match the impedance of the slit 115. Setting the length of one circumference of the slit 115 to be the electrical length of one wavelength at the frequency (communication frequency) of radio waves emitted from the radiator of the multi-module 130 is intended to include adjusting the length of the slit 115 in this manner.

Also, a resin portion 140 may be omitted from the sensor module 100. In this case, the sensor module 100 is a module that has an annular shape rather than a disk shape. Also, the sensor module 100 may have a configuration in which the portion of the through hole 112A is filled with the metal member 110, without including a resin portion 140.

FIGS. 3A to 3D are diagrams illustrating the multi-module 130. The XYZ coordinate system illustrated in FIGS. 3A to 3D corresponds to the XYZ system illustrated in FIG. 1 and FIG. 2.

Figure 3A:
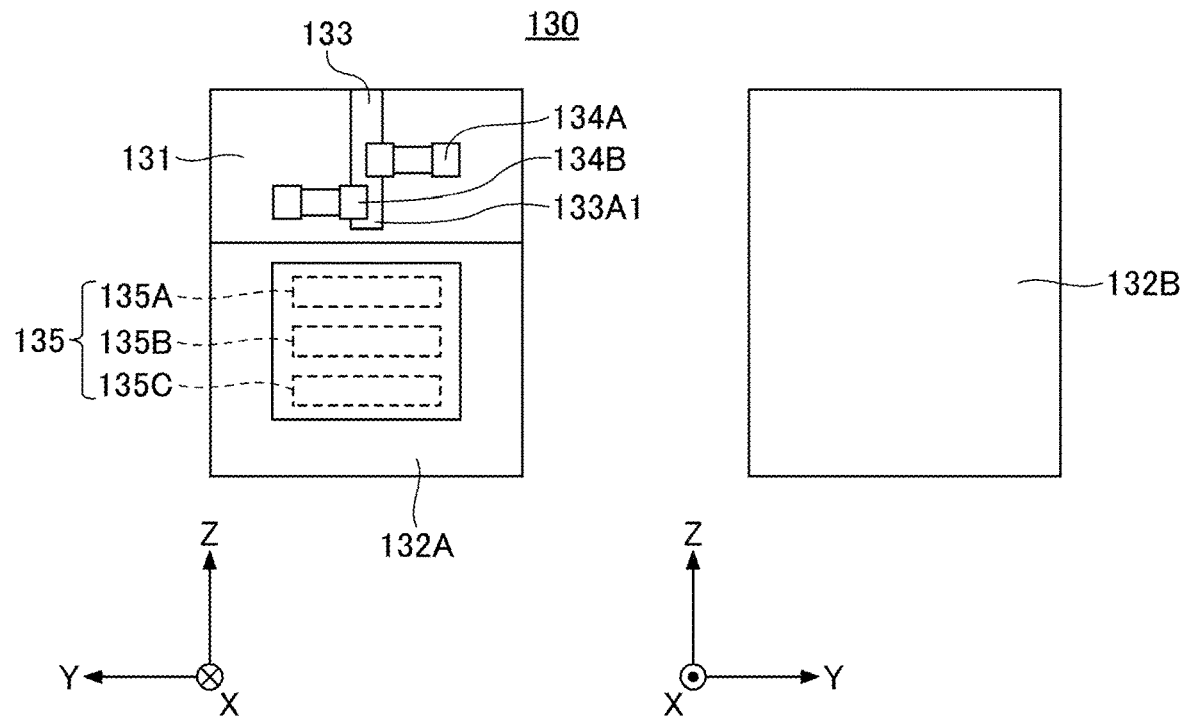
FIGS. 3A to 3D are diagrams illustrating a multi-module 130.
Figure 3B:
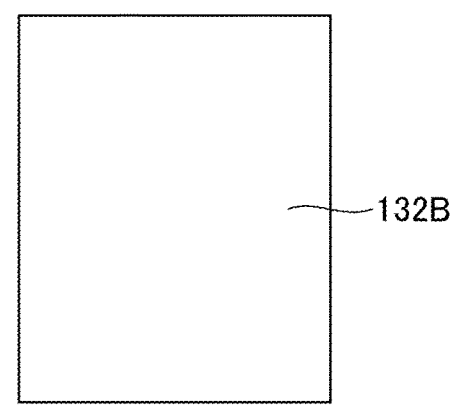

As an example, the multi-module 130 includes a substrate 131, ground layers 132A and 132B, an antenna element 133, matching circuits 134A and 134B, and a chip 135, as illustrated in FIGS. 3A and 3B.

The substrate 131 is, for example, a FR-4 (Flame Retardant type 4) wiring substrate. Also, the substrate 131 may be a flexible substrate that is realized by a polyimide film or the like. The substrate 131 is arranged in parallel to the YZ plane.

As illustrated in FIG. 3A, the ground layer 132A is provided at an about ⅔ portion of the −Z direction side of the −X direction side surface of the substrate 131. Also, the antenna element 133 is provided at an about ⅓ portion of the +Z direction side of the −X direction side surface of the substrate 131. The ground layer 132A is away from the antenna element 133. On the entirety of the +X direction side surface of the substrate 131, the ground layer 132B is provided, as illustrated in FIG. 3B.

The ground layers 132A and 132B are, for example, copper foils. The chip 135 is mounted on (the −X direction side of) the ground layer 132A. The ground layers 132A and 132B are connected by a via or the like penetrating the substrate 131 in the thickness direction (in the X direction).

The antenna element 133 is an example of a radiator and extends in the Z direction at the center in the Y direction of an about ⅓ portion of the +Z direction side of the −X direction side surface of the substrate 131. The antenna element 133 is made by patterning copper foil, for example. The antenna element 133 is a microstrip line type radiating element because the ground layer 132B is present on the back surface of the substrate 131. The antenna element 133 has a feed point 133A1 near the ground layer 132A.

For example, the matching circuits 134A and 134B are inductors or capacitors. One end of the matching circuit 134A and one end of the matching circuit 134B are connected to the antenna element 133, and the other end of the matching circuit 134A and the other end of the matching circuit 134B are connected through unillustrated vias to the ground layer 132B on the opposite side of the substrate 131. The matching circuits 134A and 134B are provided for impedance matching of the antenna element 133. By using the matching circuits 134A and 134B, a wavelength shortening effect is obtained.

The chip 135 includes a wireless communication portion 135A, a sensor 135B, and a battery 135C. For example, the wireless communication portion 135A and the feed point 133A of the antenna element 133 are connected by a core wire of a coaxial cable (not illustrated), and the antenna element 133 is supplied with power via the core wire. A shield wire of the coaxial cable is connected to the ground layers 132A and 132B.

The sensor 135B may be, for example, a strain sensor (strain gauge), an accelerometer, a thermometer, or the like. The sensor 135B outputs detected data representing distortion, acceleration, temperature, or the like of the metal member 110 to the wireless communication portion 135A. The detected data is transmitted through radio waves output from the wireless communication portion 135A, is emitted from the antenna element 133, and is emitted to the outside of the sensor module 100 by the metal member 110 functioning as a parasitic element.

The battery 135C supplies power to the wireless communication portion 135A and the sensor 135B. The battery 135C may be a secondary battery that is rechargeable by wireless power supply or may be a replaceable button battery. Also, instead of the battery 135C, wired cables may be used to supply power from an external power supply to the wireless communication portion 135A and the sensor 135B.

Figure 3C:
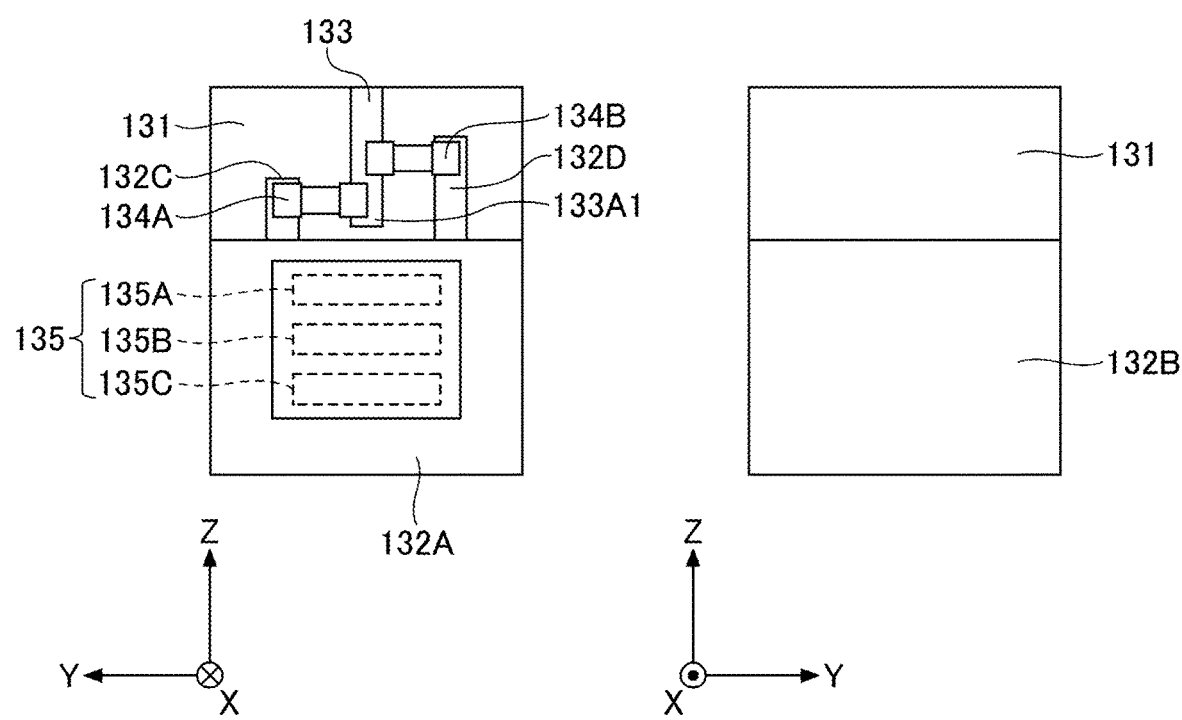
Figure 3D:
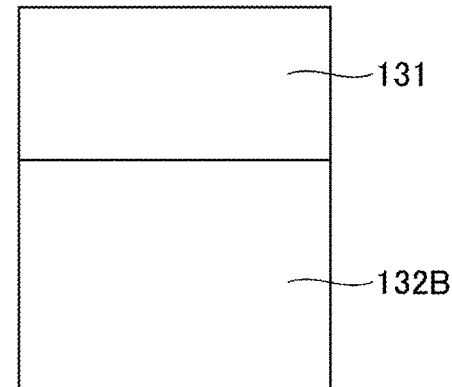

Also, the multi-module 130 may have a configuration as illustrated in FIG. 3C and FIG. 3D. For example, as illustrated in FIG. 3C, the other end of the matching circuit 134A and the other end of the matching circuit 134B may be connected to ground elements 132C and 132D provided on both sides of the antenna element 133. The ground elements 132C and 132D are lines extending from the +Z direction side edge of the ground layer 132A on both sides of the antenna element 133. In this case, as illustrated in FIG. 3D, the ground layer 132B may be provided at an about ⅔ portion of the −Z direction side of the +X direction side surface of the substrate 131, similarly to the ground layer 132A. That is, the ground layer 132B is not required to overlap the antenna element 133.

The multi-module 130 described above is provided directly below the slit 115 with the antenna element 133 oriented toward the slit 115 (+Z direction), and current flows through the antenna element 133 in the +Z direction. The antenna element 133 is provided near the slit 115. Here, "near the slit 115" refers to the antenna element 133 being close to slit 115 such that electromagnetic field coupling between the antenna element 133 and the slit 115 occurs. By obtaining electromagnetic field coupling between the antenna element 133 and the slit 115, the metal member 110 having the slit 115 functions as a parasitic element.

Then, the length of one circumference of the slit 115 is set to be the electrical length of one wavelength at the communication frequency of the multi-module 130. Also, the substrate 131 is provided such that the −X direction where the antenna element 133 is provided is oriented toward the inside of the groove portion 111A.

Therefore, the radio waves emitted from the antenna element 133 resonate at the slit 115 and are emitted to the outside of the metal member 110.

Figure 4:
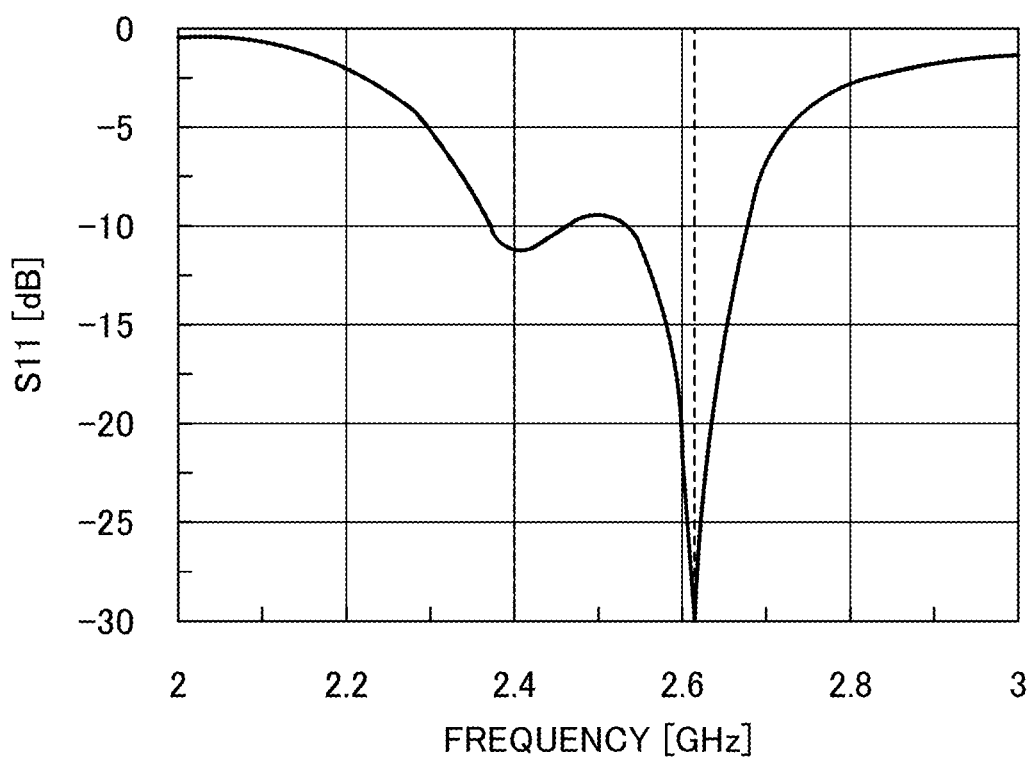
FIG. 4 is a diagram illustrating frequency characteristics of the S11 parameters of the sensor module 100.

FIG. 4 is a diagram illustrating frequency characteristics of the S11 parameters of the sensor module 100. FIG. 4 illustrates results obtained by electromagnetic field simulation in a case in which the communication frequency of the multi-module 130 was set to 2.62 (GHz), for example.

As illustrated in FIG. 4, it was found that the value of the S11 parameters was about −30 (dB) at 2.62 (GHz) and the resonance was occurred at 2.62 (GHz). It was also found that around 2.62 GHz, a broad band with extremely low reflections of −10 dB or less can be obtained. Also, the gain was 2.501 (dBi).

It should be noted that, in an example in which the communication frequency of the multi-module 130 was set to 2.40 (GHz) in a sensor module 100 having the same size, a gain of 0.971 (dBi) was obtained and a broad band was obtained with a center of 2.40 (GHz) in the frequency characteristics of the S11 parameters.

Figure 5A:
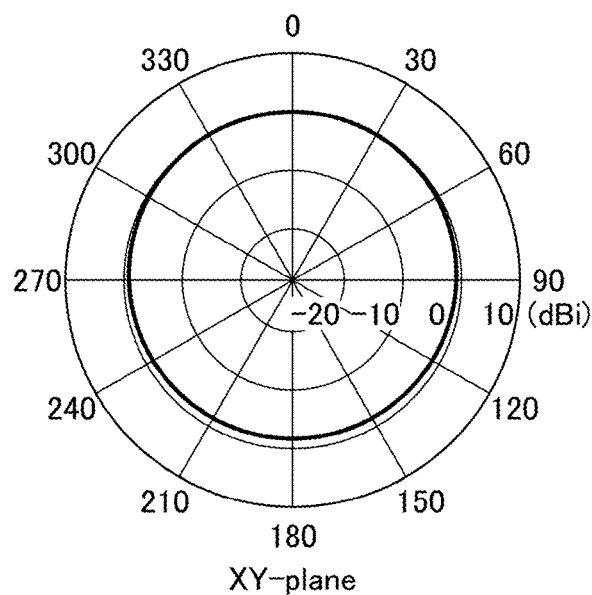
FIGS. 5A to 5D are diagrams illustrating simulation results of the directivity of the sensor module 100.
Figure 5B:
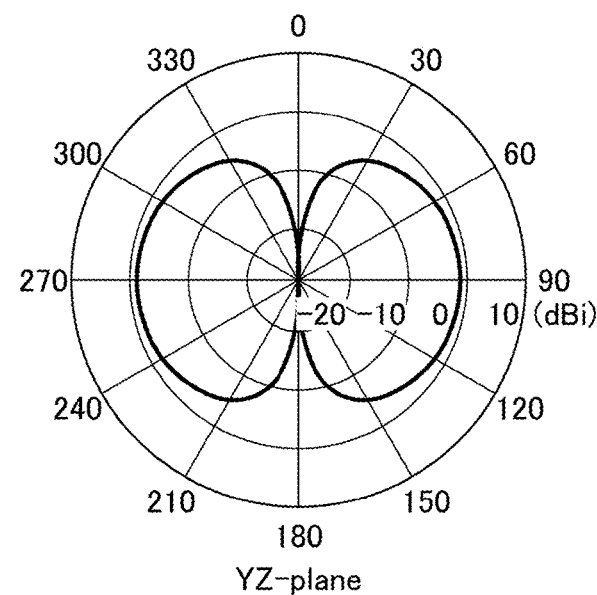

FIGS. 5A to 5D are diagrams illustrating simulation results of the directivity of the sensor module 100. FIGS. 5A and 5B illustrate the directivity at an XY plane and an YZ plane in a case in which the communication frequency of the multi-module 130 was set to 2.41 (GHz), for example. As illustrated in FIG. 5A, it was found that the obtained directivity at the XY plane was approximately uniform, and as illustrated in FIG. 5B, it was found that the upward was slightly stronger at the YZ plane.

Figure 5C:
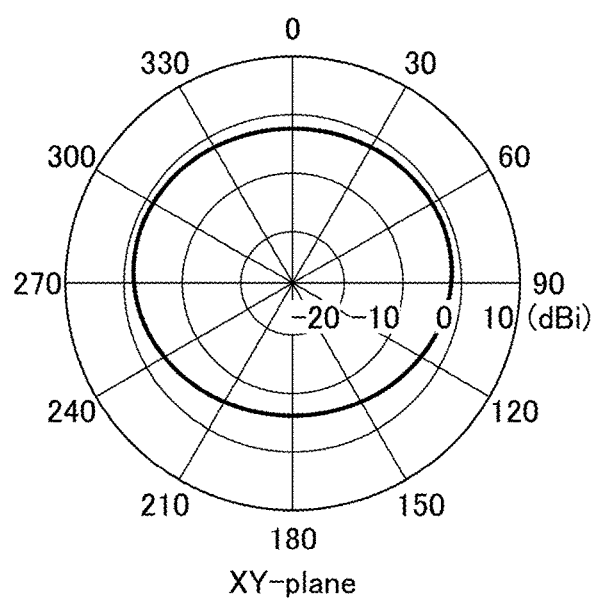
Figure 5D:
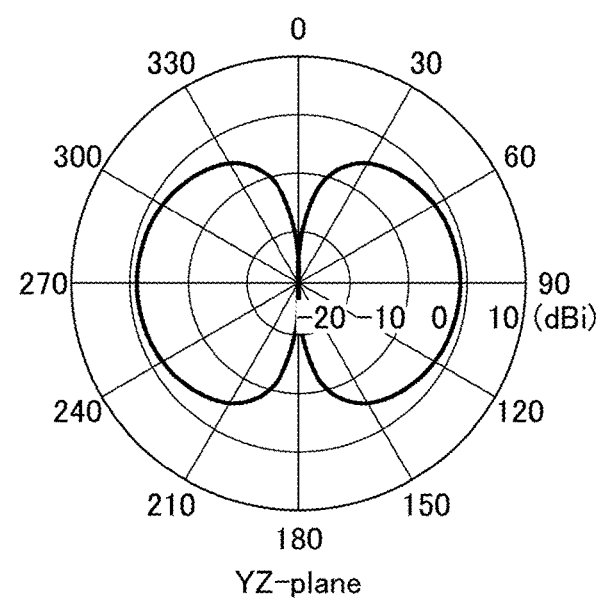

Also, FIGS. 5C and 5D illustrate the directivity at an XY plane and an YZ plane when the communication frequency of the multimodule 130 was set to 2.62 (GHz), for example. As illustrated in FIG. 5C, it was found that the obtained directivity at the XY plane was approximately uniform, and as illustrated in FIG. 5D, it was found that the upward radiation was slightly stronger in the YZ plane. It was found that similar trends are obtained at 2.41 (GHz) and 2.62 (GHz).

As described above, because the multi-module 130 is arranged within the resin portion 120 in the groove portion 111A of the metal member 110 and the metal member 110 having the slit 115 is caused to function as a parasitic element, the sensor module 100 has favorable radiation characteristics.

Accordingly, the sensor module 100 with favorable characteristics can be provided.

Also, because the antenna element 133 is arranged toward the slit 115, resonance easily occurs at the slit 115, and the sensor module 100 with favorable radiation characteristics can be provided.

Also, because the antenna element 133 is arranged near the slit 115, electromagnetic field coupling between the antenna element 133 and the slit 115 is obtained, resonance easily occurs at the slit 115, the sensor module 100 with better radiation characteristics can be provided.

Also, because of a configuration in which the multi-module 130, including the substrate 131, the ground layers 132A and 132B, the antenna element 133, the matching circuits 134A and 134B, and the chip 135, is arranged within the resin portion 120, manufacturing is easy.

Also, in a case in which the sensor module 100 is an annular module in which the portion of the resin portion 140 is a cavity without the resin portion 140, a member may be inserted in the through hole 112A. In this case, distortion, acceleration, temperature, or the like of the member inserted in the through hole 112A may be measured by the sensor module 100.

Although a configuration in which the metal member 110 has the annular slit 115 has been described, the slit 115 may be rectangular-annular or polygonal-annular in plan view, and the groove portion 111A may also be rectangular-annular or polygonal-annular in plan view. For example, a polygonal-annular shape refers to a triangle or a polygon with five or more corners (pentagon etc.).

Further, in the configuration described above, as illustrated in FIG. 2, the flange realized by the metal member 110B is oriented from the inner side toward the outer side in the radial direction of the groove portion 111A, and the annular slit 115 is constituted between the upper end of the inner peripheral surface 111A1 on the outer side of the groove portion 111A of the metal member 110A and the outer peripheral end of the metal member 110B. Then, in this case, the multi-module 130 is arranged such that the antenna element 133 is located below the slit 115.

However, by increasing the size of the metal member 110B in the radial direction, the outer peripheral end of the metal member 110B may be attached to the upper end of the inner peripheral surface 111A1 on the outer side of the groove portion 111A of the metal member 110A. In this case, the flange realized by the metal member 110B is oriented from the outer side toward the inner side in the radial direction of the groove portion 111A, and an annular slit 115 is constituted between the upper end of the inner peripheral surface 111A2 on the inner side of the groove portion 111A of the metal member 110A and the inner peripheral end of the metal member 110B. In this case, the multi-module 130 may be arranged close to the inner peripheral surface 112A2 such that the antenna element 133 is located directly below the slit 115.

Figure 6:
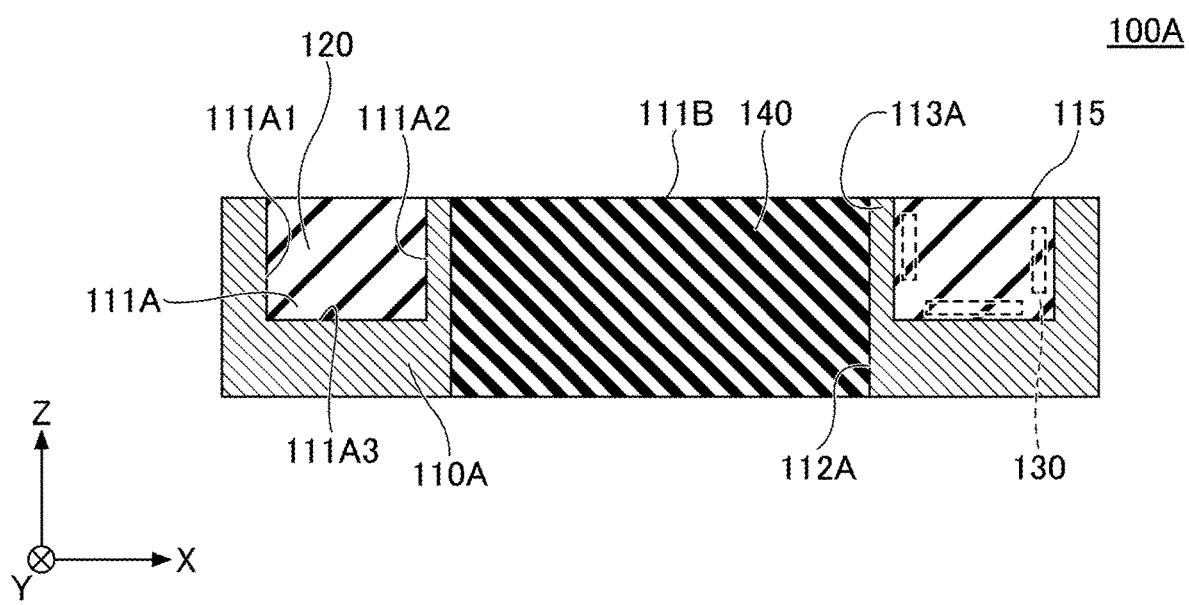
FIG. 6 is a diagram illustrating a sensor module 100A according to a modified example of the embodiment.

Also, although a configuration in which the metal member 110 includes the metal members 110A and 110B has been described above, the metal member 110 may be modified as illustrated in FIG. 6.

FIG. 6 is a diagram illustrating a sensor module 100A according to a modified example of the embodiment. The sensor module 100A has a configuration in which the metal member 110B is removed from the sensor module 100 illustrated in FIG. 1 and FIG. 2. In this case, the multi-module 130 may be provided near the inner peripheral surface 111A1 on the inner side, near the inner peripheral surface 111A2 on the outer side, or near the bottom surface 111A3, as indicated by the dashed lines in the resin portion 120 in the groove portion 111A. In a case of being provided near the bottom surface 111A3, the multi-module 130 may be arranged such that the substrate 131 (see FIG. 3) is in parallel with the bottom surface 111A3 and the antenna element 133 faces upward (in the +Z direction).

Figure 7A:
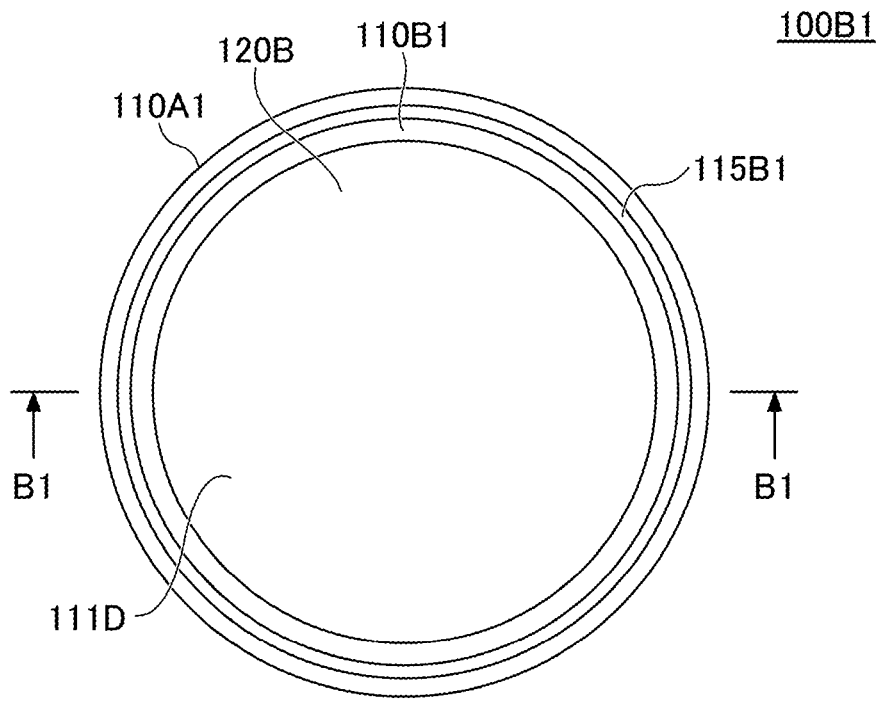
FIGS. 7A and 7B are diagrams illustrating a sensor module 100B1 according to a modified example of the embodiment.
Figure 7B:
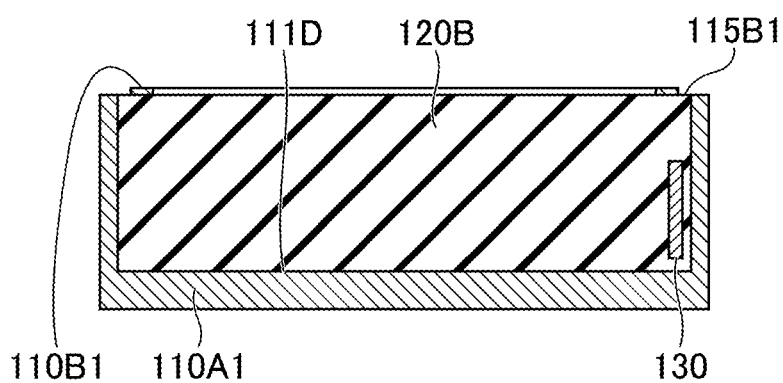
Figure 8A:
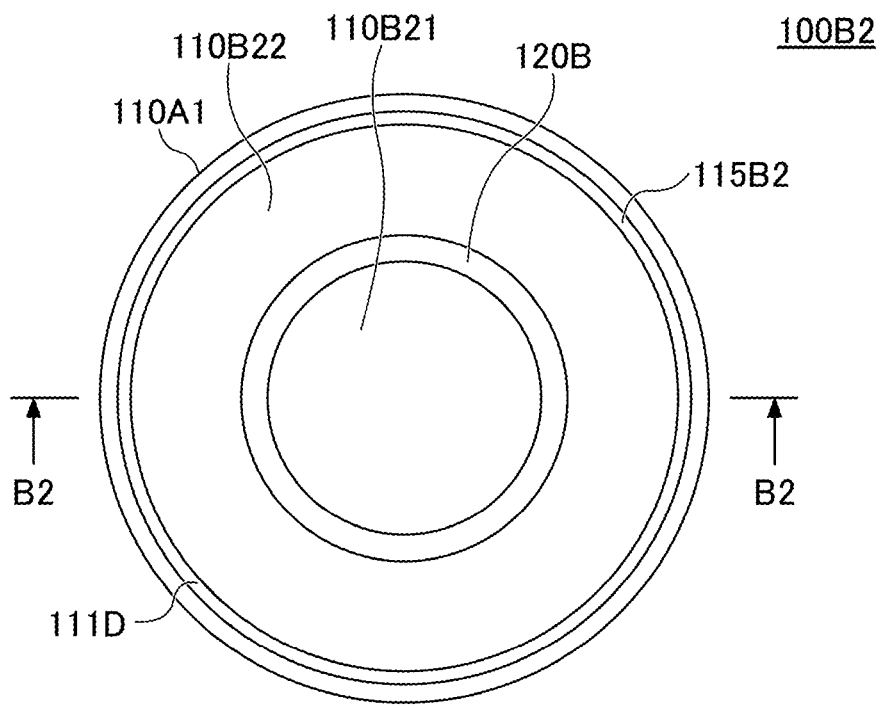
FIGS. 8A and 8B are diagrams illustrating a sensor module 100B2 according to a modified example of the embodiment.
Figure 8B:
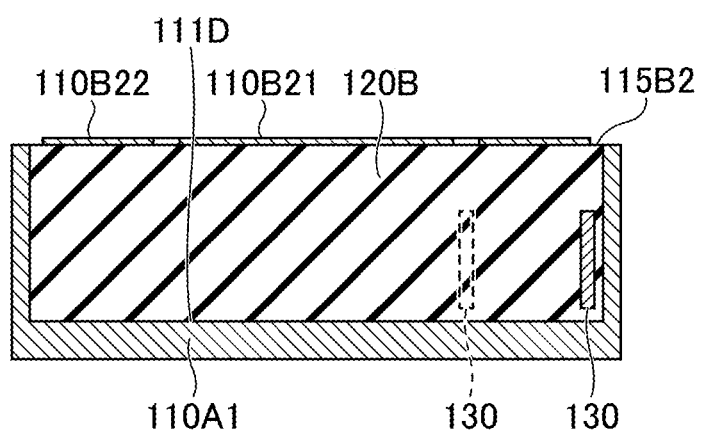
Figure 9A:
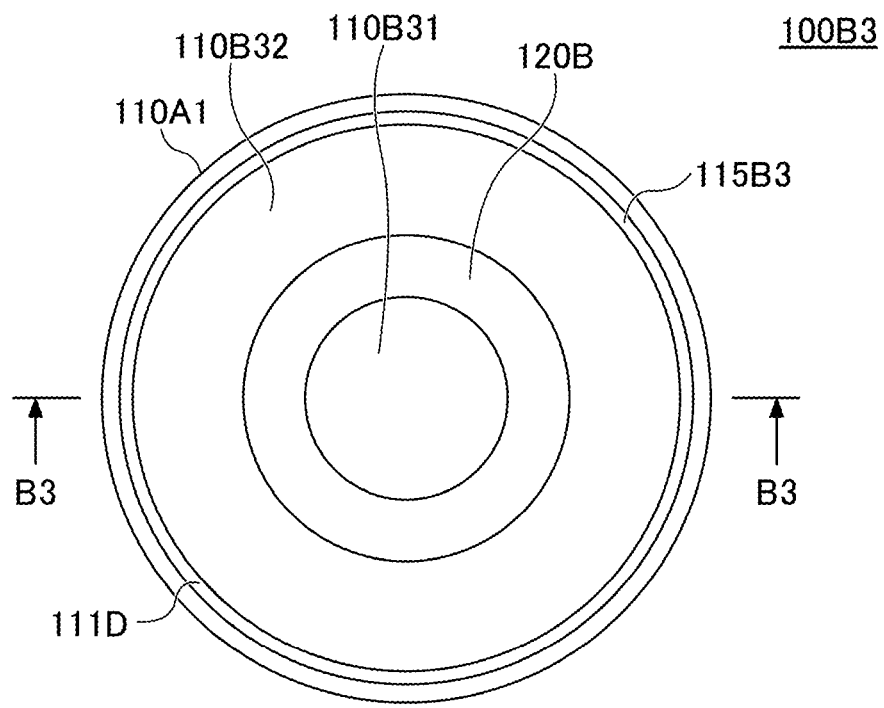
FIGS. 9A and 9B are diagrams illustrating a sensor module 100B3 according to a modified example of the embodiment.
Figure 9B:
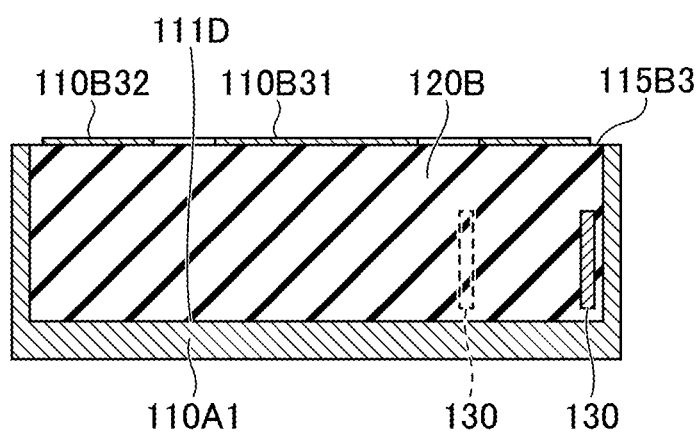

Further, although a configuration in which the metal member 110A is annular and has the groove portion 111A that is annular has been described above, the configuration may be modified as illustrated in FIG. 7 to FIG. 9. FIGS. 7A and 7B to FIGS. 9A and 9B are diagrams illustrating sensor modules 100B1 to 100B3 of modified examples of the embodiment. FIGS. 7A, 8A, and 9A illustrate the sensor modules 100B1 to 10033 in plan view. FIGS. 7B, 8B, and 9B illustrate the B1-B1 arrow cross section, the B2-B2 arrow cross section, and the B3-B3 arrow cross section respectively in FIGS. 7A, 8A, and 9A.

The sensor module 100B1 illustrated in FIGS. 7A and 7B includes metal member 110A1 and 110B1, a resin portion 120B, and a multi-module 130. The metal member 110A1 is a cylindrical member without an upper surface and has a recessed portion 111D. The recessed portion 111D is cylindrical. The resin portion 120B is embedded within the recessed portion 111D. The resin portion 120B is cylindrical. The metal member 110B1 is an annular member and is arranged on the resin portion 120. A slit 115B1 is constituted between the opening at the upper end of the recessed portion 111D of the metal member 110A1 and the outer peripheral end of the metal member 110B1. The multi-module 130 is arranged directly below the slit 115B1.

The sensor module 100B1 having such a configuration operates similarly to the sensor module 100 illustrated in FIG. 1 and FIG. 2.

The sensor module 10032 illustrated in FIGS. 8A and 8B has a configuration in which the metal member 110B1 of the sensor module 100B1 illustrated in FIGS. 7A and 7B is changed to metal members 110B21 and 110B22 that are concentrically arranged. The metal member 110B21 is a disk-shaped member arranged at the central side in plan view, and the metal member 110B22 is an annular-shaped member arranged at the outside in plan view.

A slit 115B2 is constituted between the opening at the upper end of the recessed portion 111D of the metal member 110A1 and the outer peripheral end of the metal member 110A1. The multi-module 130 is arranged directly below the slit 115B2 as indicated by the solid line.

The sensor module 100B2 having such a configuration operates similarly to the sensor module 100 illustrated in FIG. 1 and FIG. 2. It should be noted that the multi-module 130 may be provided below the slit between the metal members 110B21 and 110B22 as indicated by the dashed line.

The sensor module 100B3 illustrated in FIGS. 9A and 9B has a configuration in which the metal members 110B21 and 110B22 of the sensor module 100B2 illustrated in FIGS. 8A and 8B are changed to metal members 110B31 and 110B32. The metal member 110B31 is smaller than the metal member 110B21 in plan view, and the metal member 110B32 is the same as the metal member 110B22.

The sensor module 100B3 having such a configuration operates similarly to the sensor module 100 illustrated in FIG. 1 and FIG. 2. It should be noted that the multi-module 130 may be provided below the slit between the metal members 110B31 and 110B32 as indicated by the dashed line.

Figure 10:
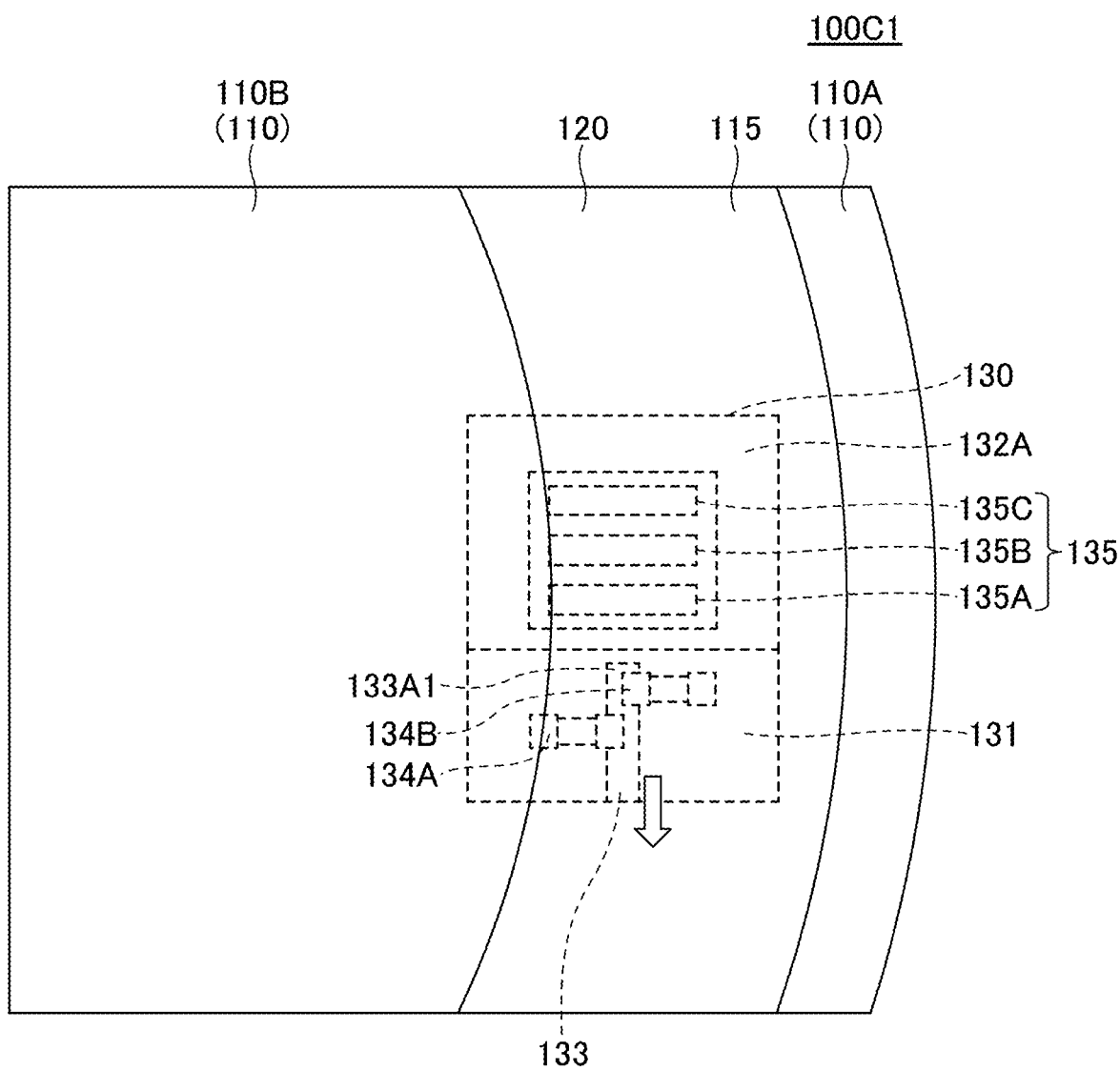
FIG. 10 is a plan view illustrating a portion of a sensor module 100C1 according to a modified example of the embodiment.

FIG. 10 is a plan view illustrating a portion of a sensor module 100C1 according to a modified example of the embodiment. The portion illustrated in FIG. 10 corresponds to the portion surrounded by the dashed line C illustrated in FIG. 1.

According to the sensor module 100C1 illustrated in FIG. 10, the substrate 131 of the multi-module 130 is arranged within the resin portion 120 to be in parallel with the XY plane. The position of the multi-module 130 in FIG. 10 is a position in parallel to the XY plane at a lower portion in the resin portion 120, among the three positions of the multi-module 130 indicated by the dashed lines illustrated in FIG. 6.

In this manner, the multi-module 130 may be arranged in the resin portion 120 and the antenna element 133 may be arranged parallel with the Y direction. In this case, current flows through the antenna element 133 in the −Y direction (the direction perpendicular to the width direction of the slit 115) as illustrated by the arrow in FIG. 10.

Figure 11:
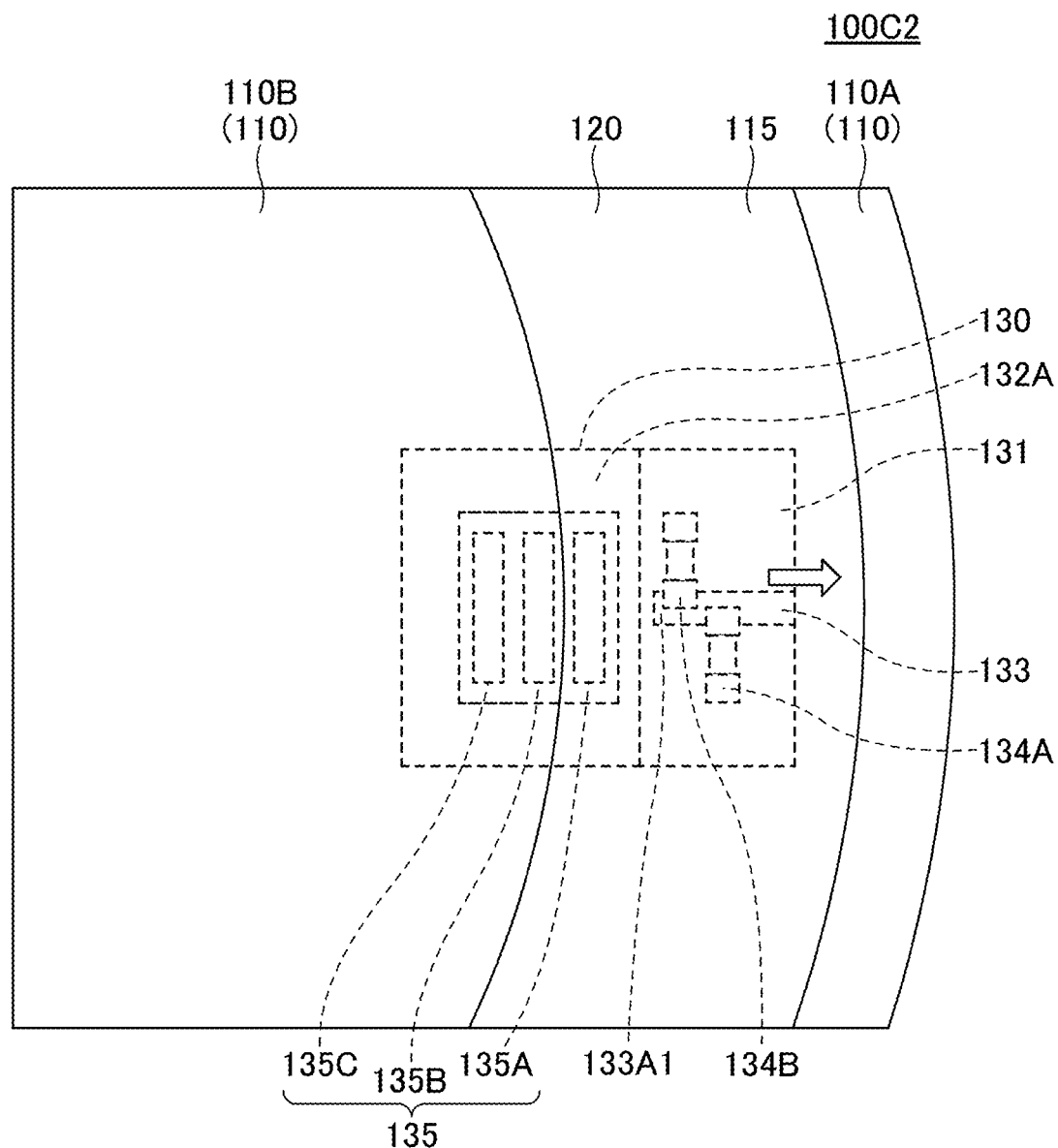
FIG. 11 is a plan view illustrating a portion of a sensor module 100C2 according to a modified example of the embodiment.

FIG. 11 is a plan view illustrating a portion of a sensor module 100C2 according to a modified example of the embodiment. Similar to FIG. 10, the portion illustrated in FIG. 11 corresponds to the portion surrounded by the dashed line C illustrated in FIG. 1.

The multi-module 130 of the sensor module 100C2 has a configuration in which the orientation of the multi-module 130 illustrated in FIG. 10 is changed and the antenna element 133 is parallel with the X direction. In this case, current flows through the antenna element 133 in the +X direction (width direction of the slit 115) as indicated by the arrow.

Figure 12:
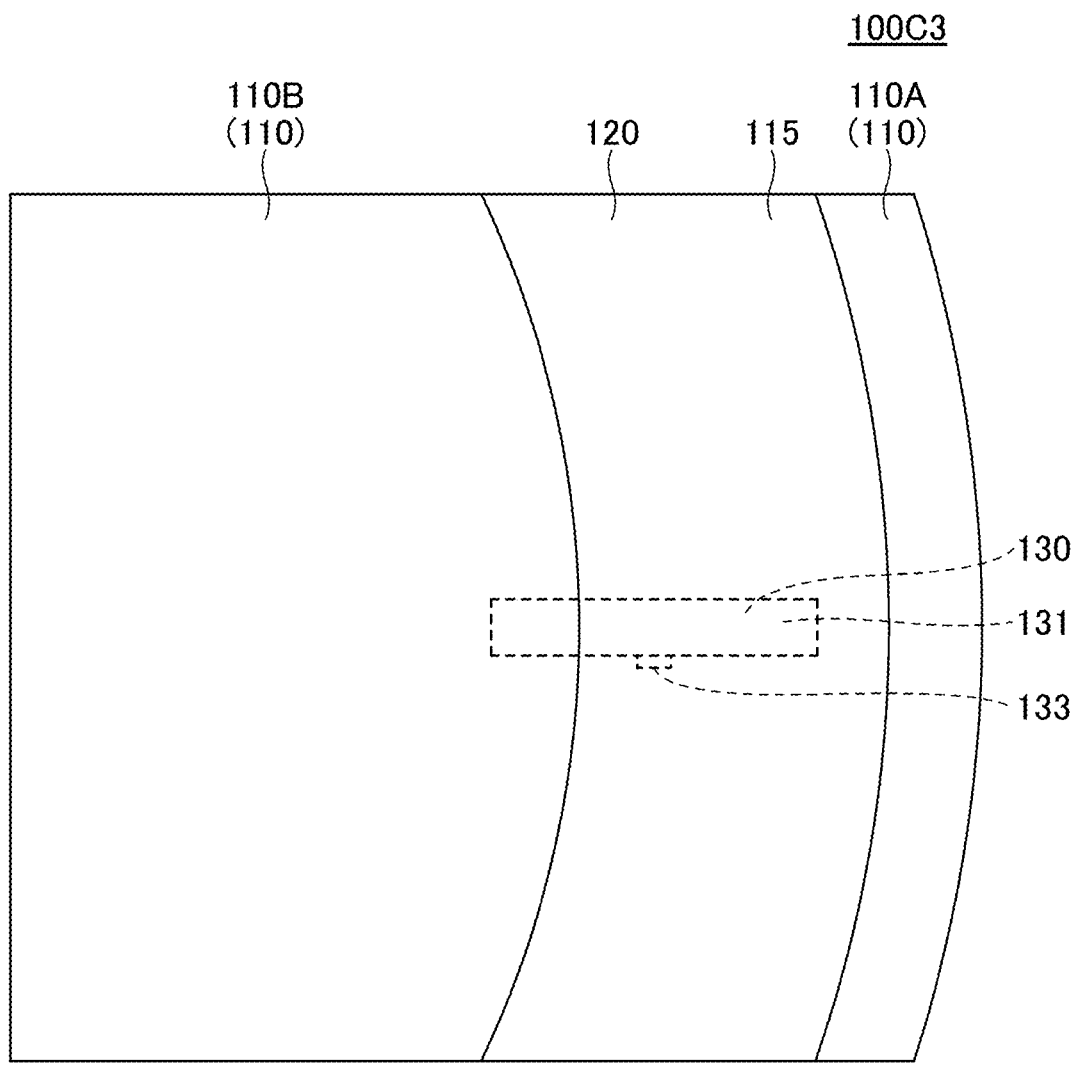
FIG. 12 is a plan view illustrating a portion of a sensor module 100C3 according to a modified example of the embodiment.

FIG. 12 is a plan view illustrating a portion of a sensor module 100C3 according to a modified example of the embodiment. Similar to FIGS. 10 and 11, the portion illustrated in FIG. 12 corresponds to the portion surrounded by the dashed line C illustrated in FIG. 1.

The multi-module 130 of the sensor module 100C3 has a configuration in which the orientation of the multi-module 130 illustrated in FIG. 10 is changed, the substrate 131 is parallel with the XZ plane, and the antenna element 133 is oriented in the +Z direction. In this case, current flows through the antenna element 133 in the +Z direction.

Figure 13:
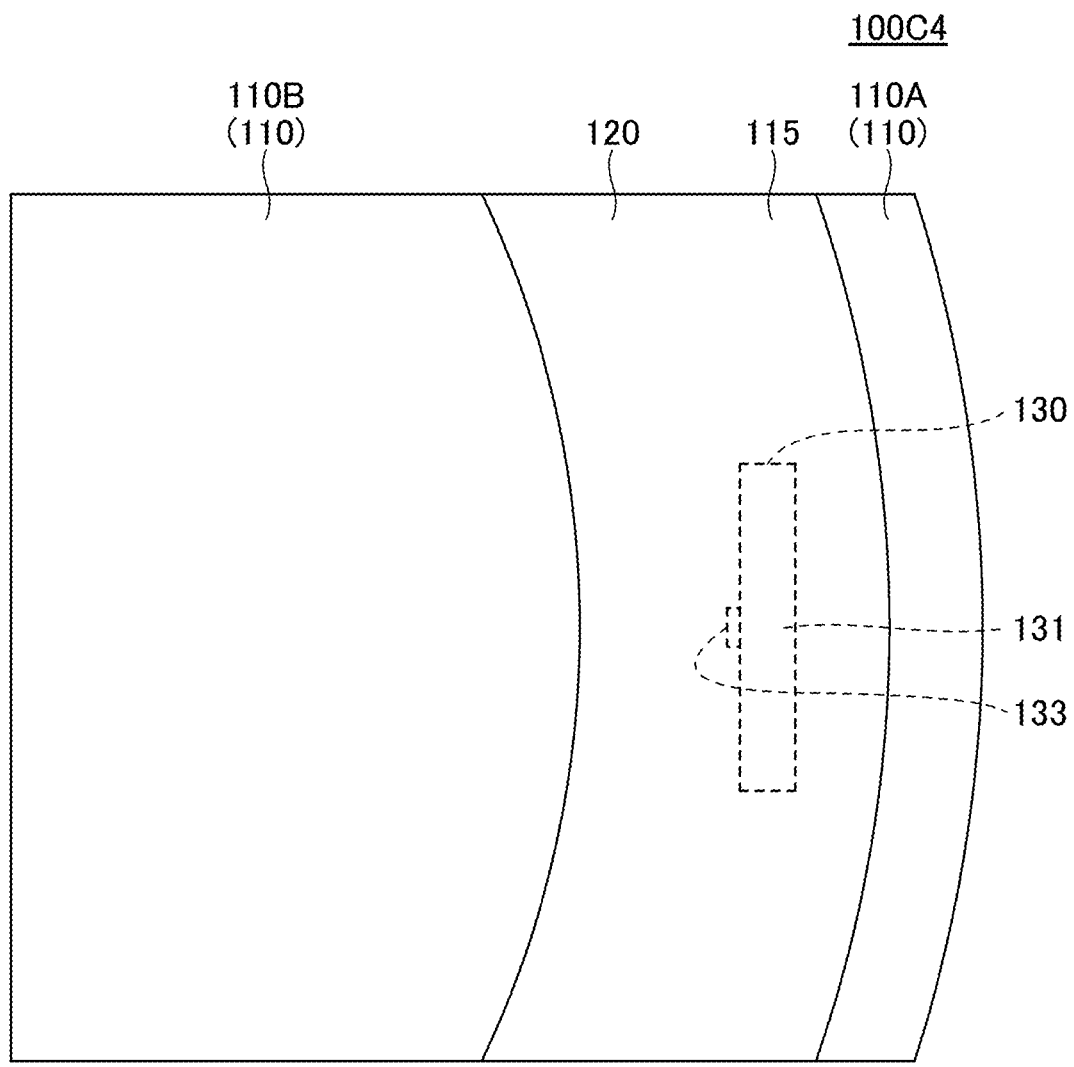
FIG. 13 is a plan view illustrating a portion of a sensor module 100C4 according to a modified example of the embodiment.

FIG. 13 is a plan view illustrating a portion of a sensor module 100C4 according to a modified example of the embodiment. Similar to FIGS. 10, 11, and 12, the portion illustrated in FIG. 13 corresponds to the portion surrounded by the dashed line C illustrated in FIG. 1.

The multi-module 130 of the sensor module 100C4 has a configuration in which the orientation of the multi-module 130 illustrated in FIG. 13 is changed, the substrate 131 is parallel with the YZ plane, and the antenna element 133 is oriented toward the +Z direction. In this case, current flows through the antenna element 133 in the +Z direction.

Figure 14:
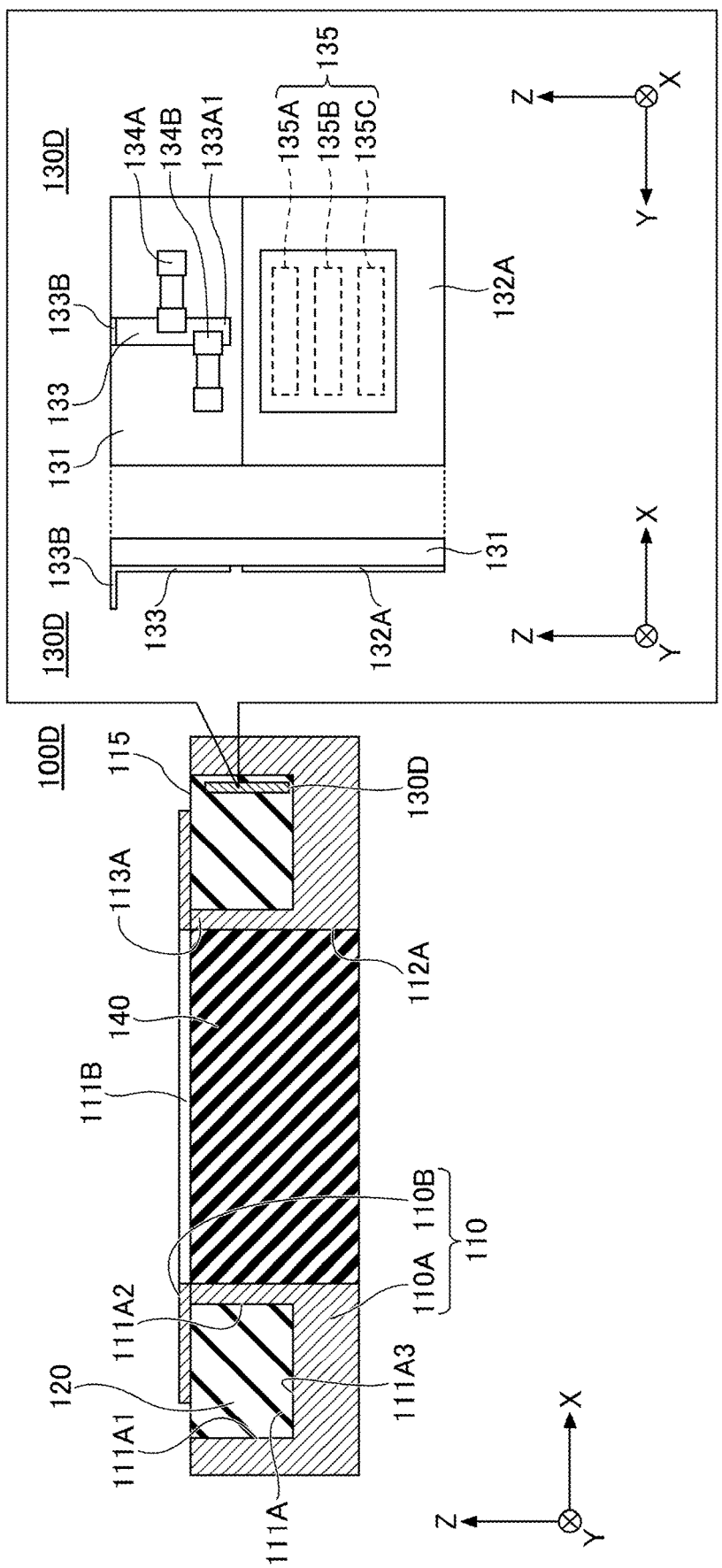
FIG. 14 is a diagram illustrating a cross-section and a portion of a sensor module 100D according to a modified example of the embodiment.

FIG. 14 is a diagram illustrating a cross-section and a portion of a sensor module 100D according to a modified example of the embodiment. The cross-section of the sensor module 100D illustrated on the left side of FIG. 14 is similar to the sensor module 100 illustrated in FIG. 2.

As illustrated and enlarged on the right side of FIG. 14, in the multi-module 130D, the substrate 131 is in parallel to an YZ plane and the antenna element 133 extends in the Z direction with a pin 133B added to the tip. The pin 133B stands in the −X direction.

In such a sensor module 100D, current flowing through the antenna element 133 in the +X direction is excited in the −X direction by the pin 133B at the tip.

Figure 15:
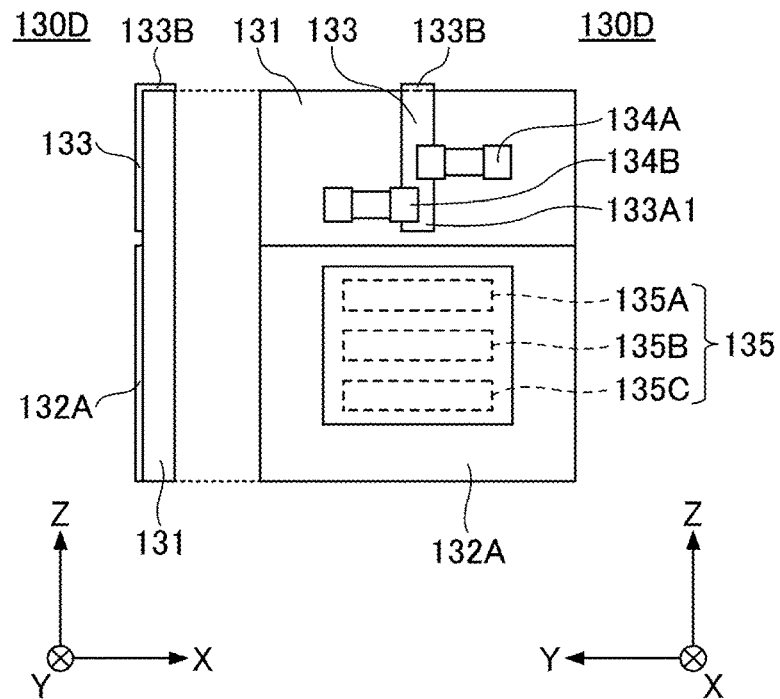
FIG. 15 illustrates a modified example of the multi-module 130D illustrated in FIG. 14.

FIG. 15 illustrates a modified example of the multi-module 130D illustrated in FIG. 14. In FIG. 15, the pin 133B is oriented at the +Z direction side end portion of the substrate 131 along the side surface of the substrate 131 toward the +X direction.

In such a multi-module 130D, current flowing through the antenna element 133 in the +X direction is excited by the pin 133B at the tip.

Figure 16:
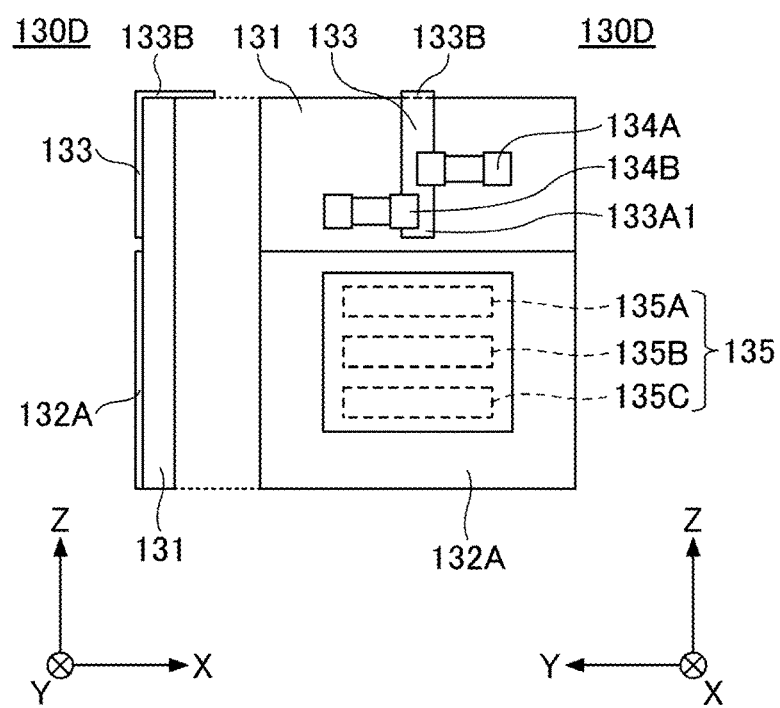
FIG. 16 illustrates a modified example of the multi-module 130D illustrated in FIG. 15.

FIG. 16 illustrates a modified example of the multi-module 130D illustrated in FIG. 15. In FIG. 16, a pin 133B is protrudes relative to the +X side surface of the substrate 131 to be longer. By using such a pin 133B, the coupling with the slit 115 is strengthened.

Figure 17:
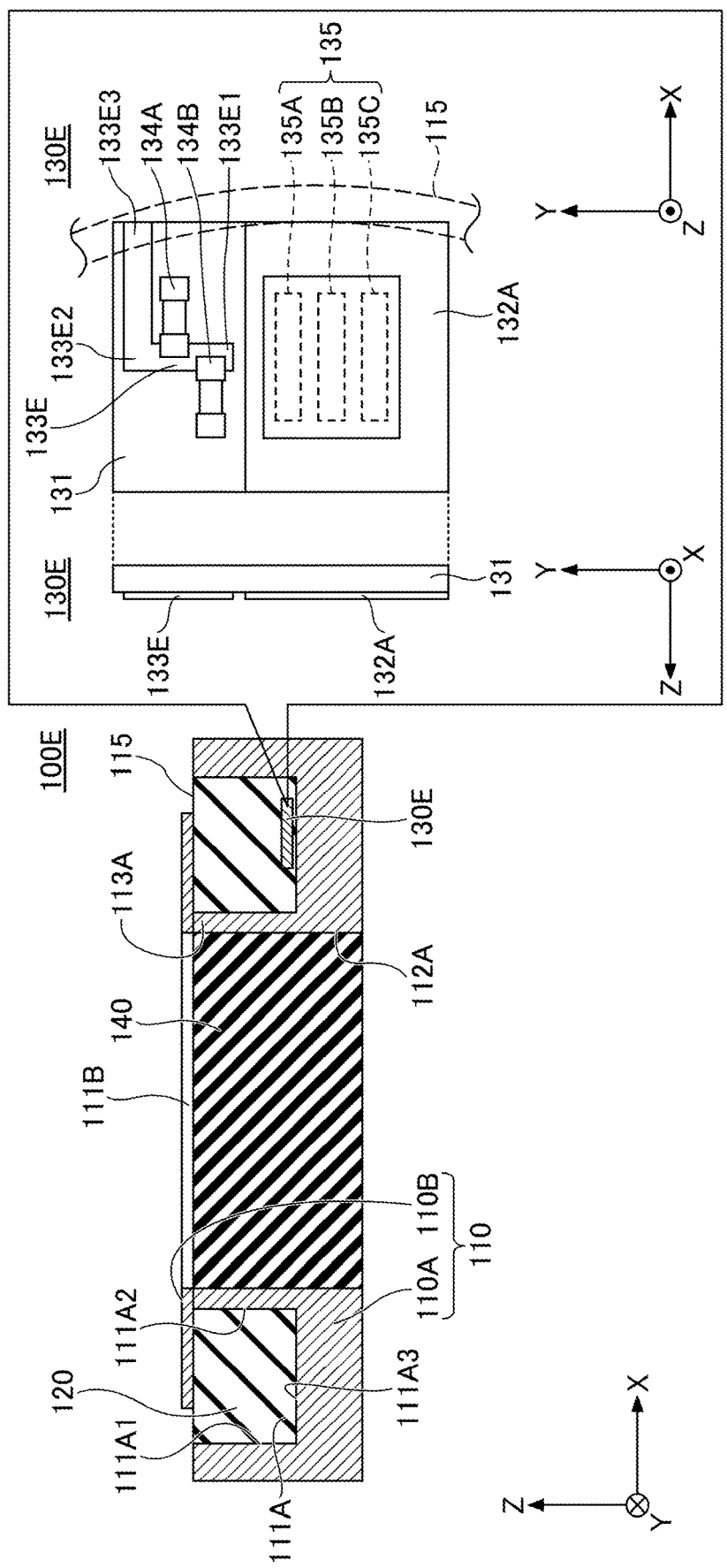
FIG. 17 is a diagram illustrating a cross-section and a portion of a sensor module 100E according to a modified example of the embodiment.

FIG. 17 is a diagram illustrating a cross-section and a portion of a sensor module 100E according to a modified example of the embodiment. As illustrated in the cross-section on the left side of FIG. 17, a multi-module 130E of the sensor module 100E is provided so that the substrate 131 is in parallel to an XY plane.

As illustrated and enlarged on the right side of FIG. 17, an antenna element 133E of the multi-module 130E extends from a feed point 133E1 to a bent portion 133E2 in the +Y direction and extends from the bent portion 133E2 to a tip portion 133E3 in the +X direction. Also, the tip portion 133E3 is provided directly below the slit 115 illustrated by the dashed line.

In such a sensor module 100E, radio waves emitted from the tip portion 133E3 of the antenna element 133E are efficiently emitted from the slit 115. Also, because of including the bent antenna element 133E, due to a change in the current direction with respect to the slit 115, the impedance characteristics change as compared to a case of not being bent. Therefore, by changing the direction in which the antenna element 133E extends, it is possible to change the current direction with respect to the slit 115 without changing the arrangement of the multi-modules 130E, and options for impedance matching between the antenna element 133E and the slit 115 can be expanded.

In addition, the section from the feed point 133E1 of the multi-module 130E to the bent portion 133E2 may be arranged toward the +Z direction. In this case, the orientations of the section from the feed point 133E1 to the bent portion 133E2 and the section from the bent section 133E2 to the tip portion 133E3 are changed with respect to the slit 115. Thus, by changing the current direction with respect to the slit 115, the impedance characteristics may be changed and options for impedance matching between the antenna element 133E and the slit 115 can be expanded.

As in FIG. 10 to FIG. 13, by changing the arrangement of the multi-module 130, it is possible to change the current direction with respect to the slit 115, and options for impedance matching between the antenna element 133 and the slit 115 can be expanded.

Further, as in FIG. 14 to FIG. 17, by changing the shape of the antenna elements 133 and 133E, it is possible to change the current direction with respect to the slit 115 without changing the arrangement of the multi-modules 130D and 130E, and options for impedance matching between the antenna elements 133 and 133E and the slit 115 can be expanded.

For the multi-modules 130D and 130E, the closer the antenna elements 133 and 133E are positioned to the slit 115, the radiation characteristics become more favorable. Therefore, by changing the shape of the antenna elements 133 and 133E, it is possible to change the current direction with respect to the slit 115, even in a case in which the multi-module 130 is vertically arranged (see FIG. 12 and FIG. 13), and options for impedance matching between the antenna elements 133 and 133E and the slit 115 can be expanded.

Figure 18:
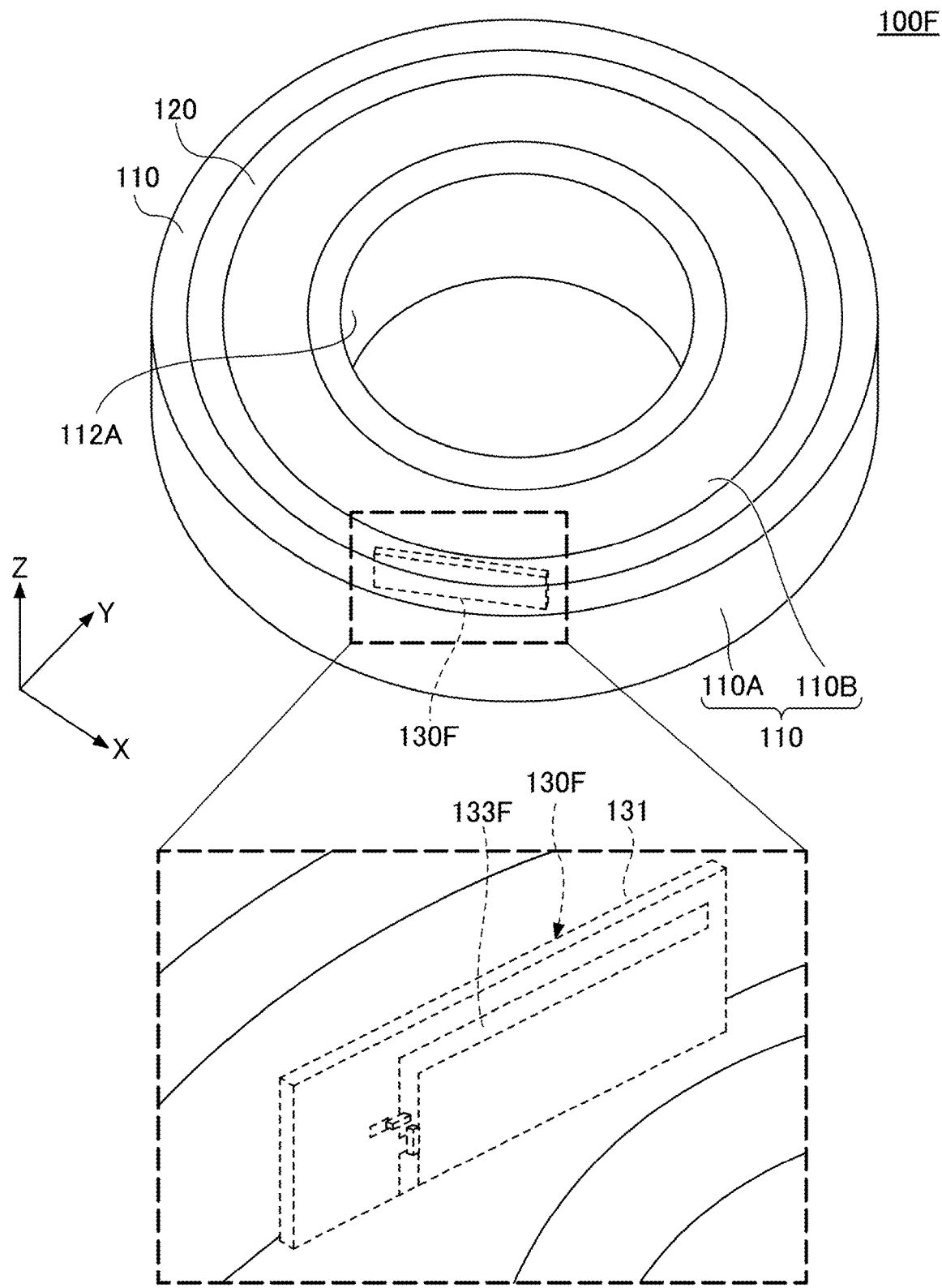
FIG. 18 is a diagram illustrating a sensor module 100F according to a modified example of the embodiment.

FIG. 18 is a diagram illustrating a sensor module 100F according to a modified example of the embodiment. The sensor module 100F includes a metal member 110 (110A, 110B), a resin portion 120, a multi-module 130F, and a resin portion 140. The sensor module 100F is a disk-shaped member.

Figure 19:
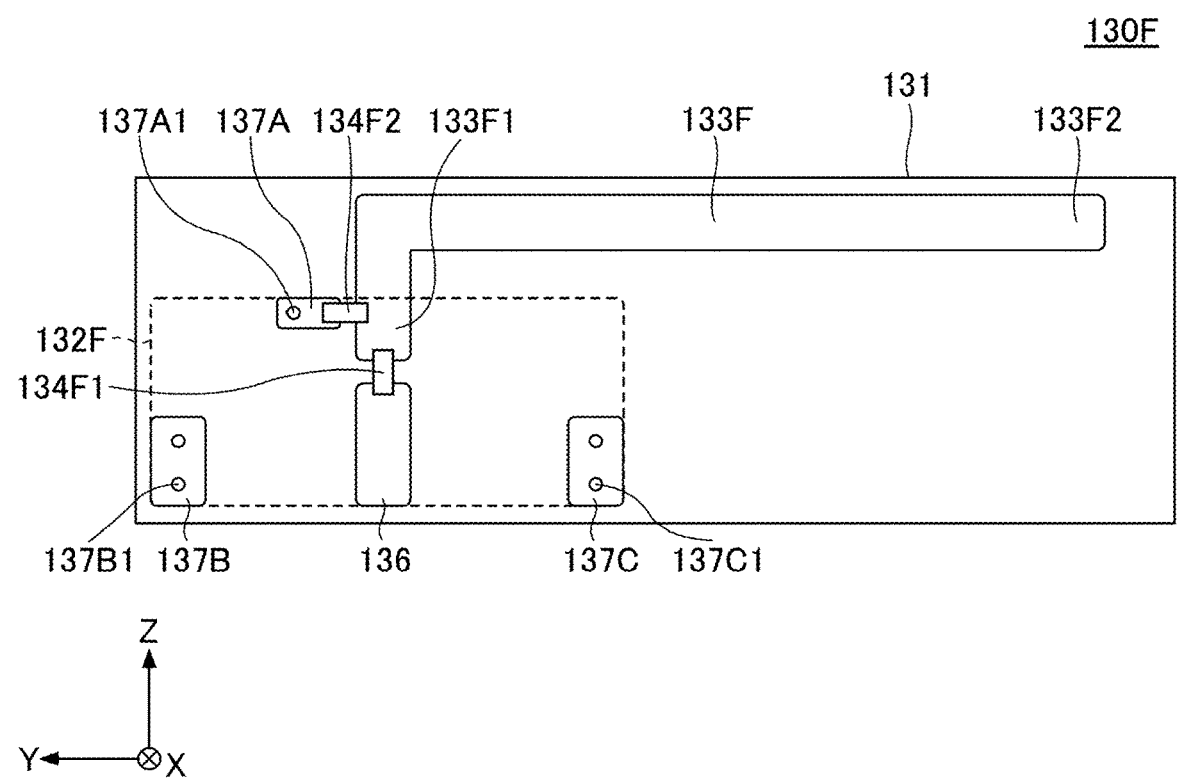
FIG. 19 is a diagram illustrating a multi-module 130F.

FIG. 19 is a diagram illustrating the multi-module 130F. The multi-module 130F includes a substrate 131, a ground layer 132F, an antenna element 133F, matching circuits 134F1 and 134F2, a feed line 136, pads 137A, 137B, and 137C as illustrated in FIG. 19.

The antenna element 133F, the matching circuit 134F1 and 134F2, the feed line 136, and the pads 137A, 137B, and 137C are provided on the −X direction side surface of the substrate 131. The ground layer 132F is provided on the +X direction side surface of the substrate 131.

The ground layer 132F is, for example, copper foil. Although a chip similar to the chip 135 (see FIG. 3A) is mounted on the surface of the ground layer 132F, the illustration is omitted in FIG. 19. The ground layer 132F is provided at a portion overlapping a feed point 133F1 of the antenna element 133F, the feed line 136, and the pads 137A, 137B, and 137C.

The antenna element 133F is an example of a radiator and extends from the feed 133F1 to a tip 133F2 in an L shape. The antenna element 133F is prepared by patterning copper foil as an example. The feed point 133F1 of the antenna element 133F overlaps the ground layer 132F, and the portion of the feed point 133F1 is a microstrip line. The feed point 133F1 is connected to the feed line 136 via the matching circuit 134F1 and is connected to the pad 137A via the matching circuit 134F2.

For example, the matching circuits 134F1 and 134F2 are inductors or capacitors. The matching circuits 134F1 and 134F2 are provided for impedance matching of the antenna element 133F. By using the matching circuits 134F1 and 134F2, a wavelength shortening effect is obtained.

The feed line 136, to which the matching circuit 134F1 is connected, overlaps the ground layer 132F and constitutes a microstrip line. The feed line 136 is connected to a wireless communication portion of a chip by a core wire of a coaxial cable (not illustrated). The antenna element 133F is supplied with power by the wireless communication portion through the feed line 136. The pads 137A, 137B, and 137C are connected to the ground layer 132F through vias 137A1, 137B1, and 137C1, respectively.

Figure 20:
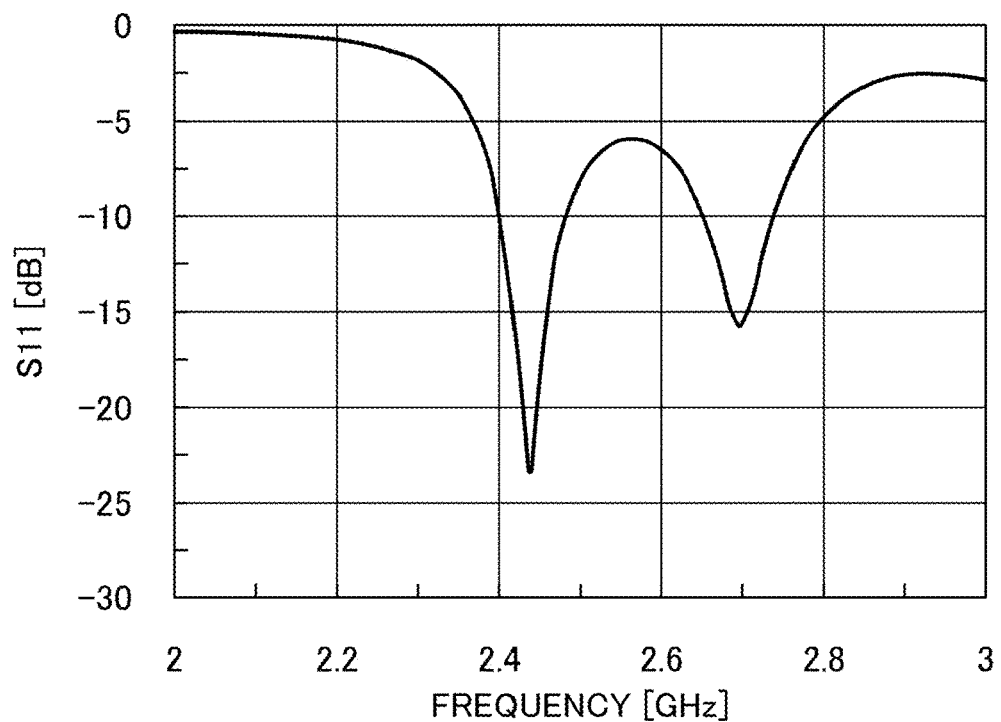
FIG. 20 is a diagram illustrating frequency characteristics of the S11 parameters of the sensor module 100F.

FIG. 20 is a diagram illustrating the frequency characteristics of the S11 parameters of the sensor module 100F. FIG. 20 illustrates results obtained by electromagnetic field simulation in a case in which the communication frequency of the multi-module 130F was set to 2.45 (GHz), for example.

As illustrated in FIG. 20, it was found that the value of the S11 parameters was about −25 (dB) at 2.45 (GHz) and the resonance was occurred at 2.45 (GHz). It was also found that around 2.45 GHz, a broad band with extremely low reflections of −10 dB or less can be obtained.

As illustrated in FIG. 18 and FIG. 19, by arranging the multi-module 130F and including the L-shaped antenna element 133F, it is possible to change the current direction with respect to the slit 115, and options for impedance matching between the antenna element 133F and the slit 115 can be expanded.

Although sensor modules according to the example embodiments of the present disclosure have been described above, the present disclosure is not limited to the example embodiments described above, and various modifications and substitutions may be made without departing from the scope of claims.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A sensor module comprising:
    a metal member having a recessed portion;
    a resin portion embedded within the recessed portion;
    a radiator provided within the resin portion and configured to emit radio waves;
    a wireless communication portion provided within the resin portion and connected to the radiator; and
    a sensor connected to the wireless communication portion,
    wherein the metal member is insulated from the radiator by the resin portion and functions as a parasitic element,
    wherein the metal member further has an annular, rectangular-annular, or polygonal-annular slit in plan view, and
    wherein the recessed portion is in communication with the slit.

2. A sensor module comprising:
    a metal member having a recessed portion;
    a resin portion embedded within the recessed portion;
    a radiator provided within the resin portion and configured to emit radio waves;
    a wireless communication portion provided within the resin portion and connected to the radiator; and
    a sensor connected to the wireless communication portion,
    wherein the metal member is insulated from the radiator by the resin portion and functions as a parasitic element, and
    wherein the metal member and the resin portion have a through hole penetrating a center in plan view.

3. The sensor module according to claim 1,
    wherein the metal member includes
        a first metal member having the recessed portion; and
        a second metal member retained by the resin portion provided within the first metal member, and the annular, rectangular-annular, or polygonal-annular slit is constituted between an opening of the recessed portion of the first metal member and the second metal member.

4. The sensor module according to claim 3, wherein the second metal member and the resin portion have a through hole penetrating a center in plan view.

5. The sensor module according to claim 3,
wherein the first metal member has a disk shape,
wherein the recessed portion is annular, and
wherein the second metal member is annular and constitutes an annular slit on an inner peripheral side or an outer peripheral side of the annular recessed portion.

6. The sensor module according to claim 1, wherein the radiator is provided within the resin portion toward the slit.

7. The sensor module according to claim 1, wherein the radiator is provided near the slit.

8. A sensor module comprising:
a metal member having a recessed portion;
a resin portion embedded within the recessed portion;
a radiator provided within the resin portion and configured to emit radio waves;
a wireless communication portion provided within the resin portion and connected to the radiator;
a sensor connected to the wireless communication portion; and
a substrate provided within the resin portion,
wherein the metal member is insulated from the radiator by the resin portion and functions as a parasitic element, and
wherein the radiator, the wireless communication portion, and the sensor are mounted on the substrate.

9. The sensor module according to claim 8,
wherein the metal member further has an annular, rectangular-annular, or polygonal-annular slit in plan view,
wherein the recessed portion is in communication with the slit, and
wherein the metal member includes
a first metal member having the recessed portion; and
a second metal member retained by the resin portion provided within the first metal member, and the annular, rectangular-annular, or polygonal-annular slit is constituted between an opening of the recessed portion of the first metal member and the second metal member.

10. The sensor module according to claim 9, wherein the second metal member and the resin portion have a through hole penetrating a center in plan view.

11. The sensor module according to claim 9,
wherein the first metal member has a disk shape,
wherein the recessed portion is annular, and
wherein the second metal member is annular and constitutes an annular slit on an inner peripheral side or an outer peripheral side of the annular recessed portion.

12. The sensor module according to claim 8,
wherein the metal member further has an annular, rectangular-annular, or polygonal-annular slit in plan view,
wherein the recessed portion is in communication with the slit, and
wherein the radiator is provided within the resin portion toward the slit.

13. The sensor module according to claim 8,
wherein the metal member further has an annular, rectangular-annular, or polygonal-annular slit in plan view,
wherein the recessed portion is in communication with the slit, and
wherein the radiator is provided near the slit.

* * * * *